United States Patent [19]

Kimoto

[11] Patent Number: 4,514,804
[45] Date of Patent: Apr. 30, 1985

[54] INFORMATION HANDLING APPARATUS HAVING A HIGH SPEED INSTRUCTION-EXECUTING FUNCTION

[75] Inventor: Manabu Kimoto, Tokyo, Japan

[73] Assignee: Nippon Electric Co., Ltd., Tokyo, Japan

[21] Appl. No.: 324,787

[22] Filed: Nov. 25, 1981

[51] Int. Cl.³ .............................................. G06F 9/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,040,031 | 8/1977 | Cassonnet | 364/200 |
| 4,073,006 | 2/1978 | Tubbs | 364/200 |
| 4,093,983 | 6/1978 | Masog et al. | 364/200 |
| 4,099,230 | 7/1978 | Mead | 364/200 |
| 4,117,536 | 9/1978 | Bodner | 364/200 |
| 4,155,120 | 5/1979 | Keefer et al. | 364/200 |
| 4,212,060 | 7/1980 | Prey | 364/200 |
| 4,236,206 | 11/1980 | Strecker et al. | 364/200 |
| 4,325,118 | 4/1982 | DeVita et al. | 364/200 |
| 4,398,244 | 8/1983 | Chu et al. | 364/200 |
| 4,409,654 | 10/1983 | Wada et al. | 364/200 |

OTHER PUBLICATIONS

Motorola, "M6800 Microprocessor Application Manual", 1975, pp. 1-33 to 1-34 and 1-8.

Primary Examiner—James D. Thomas
Assistant Examiner—William G. Niessen
Attorney, Agent, or Firm—Laff, Whitesel, Conte & Saret

[57] ABSTRACT

An information handling apparatus comprises a memory storing a group of instructions. A memory location is designated where the instruction is to be read out of the memory. After a predetermined instruction has been read out, a signal is generated for inhibiting an execution of at least one subsequently scheduled instruction. After a short period of time, an address for a next new instruction is prepared. The new instruction is then read out in response to the prepared address. The instructions are regulated so that, although at least one portion of the instruction is read out of the memory by memory accessing, the processing defined by the instruction is not immediately executed. Typically, one such instruction may be followed by an instruction to subsequently skip an instruction.

2 Claims, 8 Drawing Figures

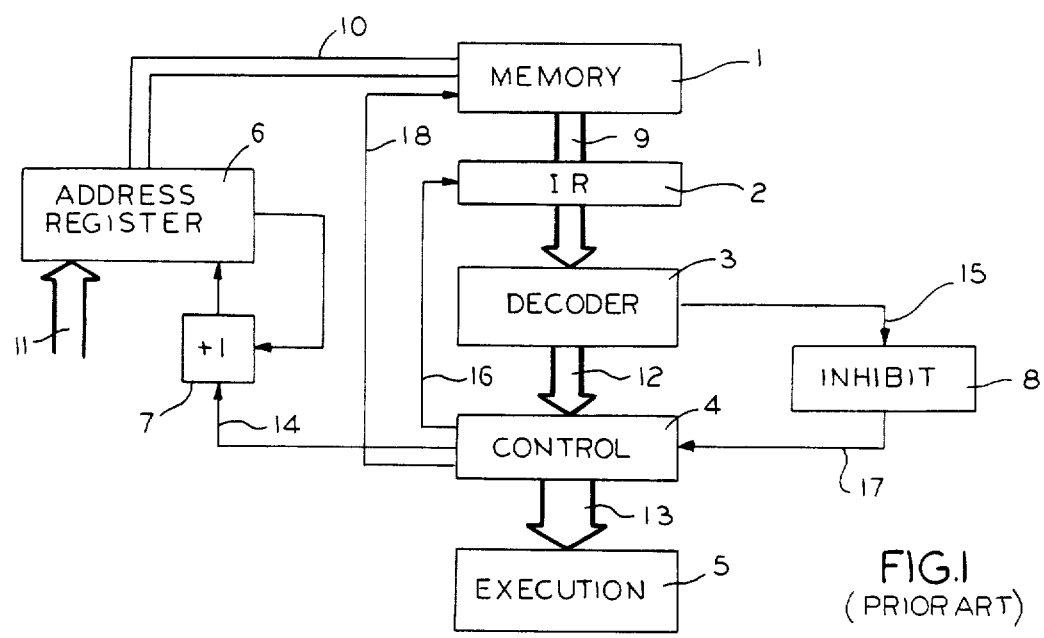
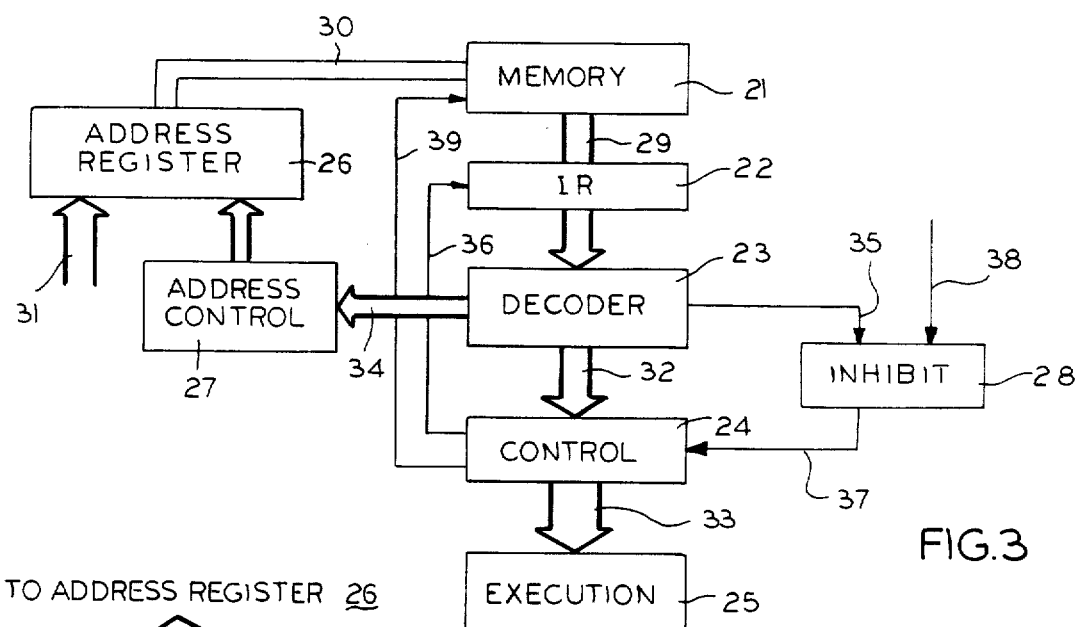
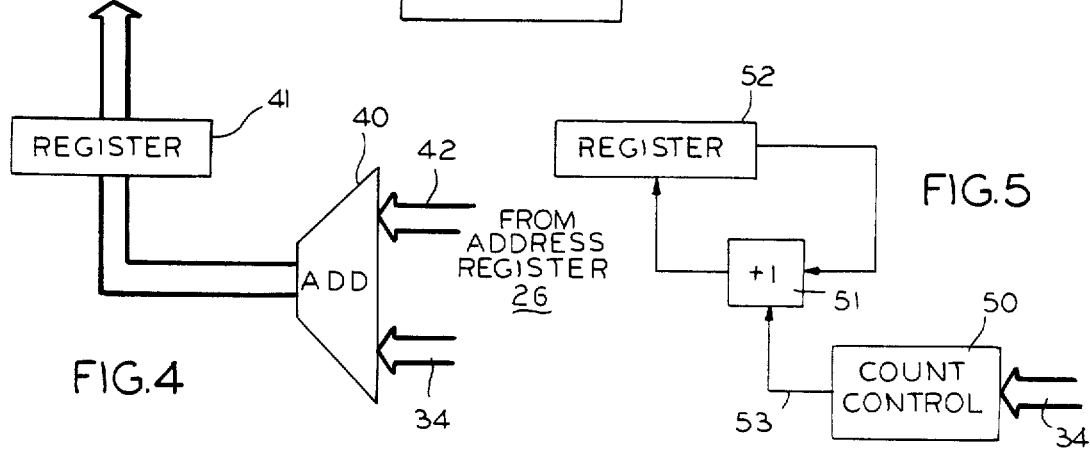

INFORMATION HANDLING APPARATUS HAVING A HIGH SPEED INSTRUCTION-EXECUTING FUNCTION

The present invention relates to an information handling apparatus, and more particularly to improvements in an apparatus comprising means for reading memory contents, means for decoding the read memory contents and means for executing a processing step or steps on the basis of the decoded results.

BACKGROUND OF THE INVENTION

An operation of the respective means of the mentioned apparatus is controlled by at least one timing signal produced by timing control circuit in order to execute a desired program. Such an apparatus has been heretofore generally used as a principal section, i.e., a program processing section of every information handling instrument from a large-scale computer to a micro-computer.

This apparatus normally comprises a memory for storing a group of instructions (commands, subroutines, microprograms, etc.) which are required for executing a program. Data is stored in a binary coded form. A circuit is provided for designating a particular instruction in the memory (an addressing circuit), and another circuit for reading the designated instruction from the memory. A circuit temporarily holds the read instruction (an instruction register), while another circuit decodes the read instruction (a decoder). At least one control signal is generated on the basis of the decoded result (a timing control circuit) and a circuit responds to the control signal for executing the processing determined by the instruction (an execution circuit). The addressing circuit includes an address register, whose content represents an address for the memory.

Accordingly, by sequentially modifying the content of the address register, instructions required for executing a given program are successively read out of the memory into the instruction register. The instructions designate an operation of the execution circuit. There are many varieties of instructions such as, for example, calculation instructions, data transfer instructions, a subroutine call instruction, a jump instruction, etc.

It is to be noted that an instruction has to be executed within a predetermined period. This execution period is defined by at least one cycle time of a machine (normally called "machine cycle"). Furthermore, the execution period of an instruction is not always constant for every instruction. In other words, a number of necessary machine cycles may be determined depending upon the instruction. For instance, for an instruction to merely add the content of an a single register to the content of a another single register, only one machine cycle suffices. However, an addition instruction to add the content of a memory location whose address is designated by a content of an a pair of registers to the content of an a single register, necessitates two machine cycles. Moreover, some of complexed instructions may require 5 machine cycles, for example or 6 machine cycles. Accordingly, a sum of the machine cycles allotted to the respective instructions, is a processing time of the program.

On the other hand, a number of bits of an instruction that can be read out of a memory during one access is equal to a number of bits that can be carried by a data bus. That is, if a data bus consists of a one-bit line, then an instruction code of one bit can be read. If a data bus consists of a 4-bit line, then an instruction code of 4 bits can be read out in parallel in the same timing. Normally, one instruction is coded with a plurality of bits. In order to achieve a speed-up of processing, a design is made such that an instruction code of a plurality of bits may be read out in parallel. For instance, 4 bits, 8 bits, 16 bits, etc. are simultaneously read out of a memory as a unit (one byte.

Further, if each one instruction is limited to one byte, then a number of available instructions would be limited. For example, if one byte consists of 4 bits, then the number of the available instructions is $2^4=16$. In order to increase the number of the available instructions, it is only necessary to increase the number of bits per one byte. However, in that case, a number of wirings for a data bus or an address bus is increased, and so this is not favorable, especially in a small-sized type of machines.

Therefore, in the prior art, it was contemplated that, to overcome this shortcoming, it was necessary to increase a number of bytes per instruction. In this case, as a matter of course, a number of accesses to a memory is increased. For instance, if one instruction consists of 3 bytes, then three successive accesses to the memory are required. To that end, an addressing circuit must perform a processing by modifying a content of an address register three times. Normally, the respective bytes forming one instruction are alotted in consecutive address spaces. Accordingly, the addressing circuit has a facility for sequentially adding "one" to an address of a leading byte of an instruction (increment facility). However, at least one machine cycle is generaly necessitated for one memory access; for instance in order to read a 3-byte instruction at least 3 machine cycles are required. Furthermore, additional machine cycles are also required for processing the read instruction. Therefore, if a number of bytes in an instruction is increased, then a processing speed is correspondingly lowered, and this was an inevitable shortcoming in the prior art.

On the other hand, in order to achieve a speed-up of data processing, it may be conceived to increase a frequency of a clock signal for controlling the minimum operation timing of an apparatus. However, integrated circuit elements which can follow such a high-speed clock signal have not been mass-produced so far. Even if integrated circuit elements, which are operable in response to the high-frequency clock signal should be mass produced, it would be naturally expected that a still further high-speed program processing is desired.

On the other hand, as would be understood from checking the execution steps of many programs, all of those instructions, which are read out of a memory by address designation, are not always to be executed. It is difficult for a programmer to control a sequence of memory accesses corresponding to every programming condition. Therefore, the program sometimes contains instructions which are not to be executed, although they are read out of the memory by the memory access.

Further, there is frequently an occasion when a programmer makes a program to prohibit the execution of an accessed instruction under a predetermined condition. On this occasion, the execution of the instruction is prohibited by another instruction or by a control signal from a condition detect circuit which is working independently of instructions. Of course, there are some cases where a condition of the apparatus is judged by an instruction and the execution of the instruction which is read out of the memory is prohibited, according to the judged condition.

In the prior art, the instruction for cancelling or inhibiting the execution has to be exchanged to a non-operation (NOP) instruction. This NOP instruction is an instruction that keeps a condition in an apparatus as it is. However, an execution period of the NOP instruction has to be equal to an essential execution period alotted to the instruction for the inhibited execution. For instance, if an instruction, which should be inhibited, is a 2-machine cycle instruction, the NOP instruction necessitates two machine cycles. If a canceled instruction is a 5-machine cycle-instruction, the NOP instruction needs five machine cycles in its processing.

Although this NOP instruction is necessary in a program execution, a time period for its execution should be as short as possible. However, in the prior art, the time period of the NOP instruction can not be shortened because of the necessity for making the memory access.

SUMMARY OF THE INVENTION

It is, therefore, one object of the present invention to provide an information handling apparatus which can execute high-speed program processing.

Another object of the present invention is to provide an information handling apparatus which can change an address designating a first instruction to such an address that designates a second instruction following the first instruction, at a high speed, when the first instruction is not to be executed.

Still another object of the present invention is to provide an information handling apparatus in which the preparation of discrete or discontinuous addresses for memory access can be performed at a high speed.

Yet another object of the invention is to provide an information handling apparatus having an address control function to produce the next new address for reading a second instruction following the first instruction, when an execution of a first instruction is unnecessary after it has been read out of a memory. The new address is read out within a period of time which is shorter than a predetermined time period that is assigned to execute the first instruction.

A further object of the present invention is to provide an information handling apparatus having a novel circuit with an address modification.

A still further object of the invention is to provide an information handling apparatus which can produce an address for a next instruction if an execution of an instruction consisting of a plurality of bytes is not required. The next instruction address is produced without producing all addresses for reading out all bytes of the instruction in a memory.

A yet further object of the present invention is to provide an information handling apparatus including a circuit which can achieve a processing among instructions subsequent to a particular instruction. An instruction of the same type as the previously executed particular instruction is omitted from execution at a high-speed.

A still further object of the present invention is to provide an information handling apparatus including a control circuit which is enabled to skip a scheduled instruction and read out the next instruction in a period that is shorter than the period required for executing the scheduled instruction.

The information handling apparatus, according to the present invention, comprises a memory in which a group of instructions are stored. A memory location is designated where the instruction to be read is stored, and the designated instruction is read out of the memory. When a predetermined instruction has been read out and a detection signal is generated. The execution of at least one subsequently scheduled instruction is inhibited in response to the detection signal. A short period of time is prepared for an address for a next new instruction of the instruction, following the inhibited execution. The new instruction is read out in response to the prepared address.

"An instruction whose execution is inhibited", as defined according to the present invention, means an instruction regulated so that, although at least one portion of the instruction or an information with respect to the instruction, is read out of the memory by memory accessing, the processing defined by the instruction is not executed. In other words, it means (a) instructions wherein the results obtained by executing the instruction should be disregarded, or (b) that, at the time point, there is no need to process as defined by the instruction, or (c) that the processing defined by the instruction should be omitted under a predetermined condition. Typically, one such instruction is an instruction subsequent to a skip instruction, or an instruction subsequent to a particular instruction in an instruction group consisting of a plurality of consecutive instructions of the same type, and the like, as will be fully described later.

These instructions are different from the conventional branch instruction. Namely, they are instructions such that, in the prior art, they were once read out in response to memory access. However, under a certain condition, their inherent processings were omitted without being executed. The location in a memory where such instruction is physically set, could be either just subsequent to the instruction defining the certain condition or remote from the latter instruction.

According to the present invention, in order to shorten a processing time for such are instruction, there is a circuit means for preparing an address of the next instruction, at a high speed. In other words, the information handling apparatus, according to the present invention, comprises means for replacing an address of an instruction, which is not to be executed, by an address of the next instruction which is to be executed. Accordingly, the time required when such an instruction is detected and thereafter omitted can be made very short. Hence, a sequence control of a program can be executed at a high speed. Consequently, even though an operation clock frequency is not raised, a program processing period can be sufficiently shortened, upon applying the present invention to an apparatus employing the heretofore known integrated circuit elements, which are operable only at a relatively low speed. In addition, as will be described later, the present invention is especially effective in the case of canceling an execution of an instruction consisting of a plurality of bytes. Moreover, the present invention is also effective for an instruction which necessitates a plurality of machine cycles, even when the instruction is a one-byte instruction.

BRIEF DESCRIPTION OF THE DRAWINGS

The above-mentioned and other objects, features and advantages of the present invention will become more apparent by reference to the following description of preferred embodiments of the invention taken in conjunction with the accompanying drawings, wherein:

FIG. 1 is a block diagram of an information handling apparatus in the prior art;

FIG. 3 is a block diagram illustrating one preferred embodiment of the information handling apparatus according to the present invention;

FIG. 4 is a block diagram showing one practical example of an address control circuit in the apparatus illustrated in FIG. 3;

FIG. 5 is a block diagram showing another practical example of the address control circuit;

DESCRIPTION OF THE PRIOR ART

Figure 2:
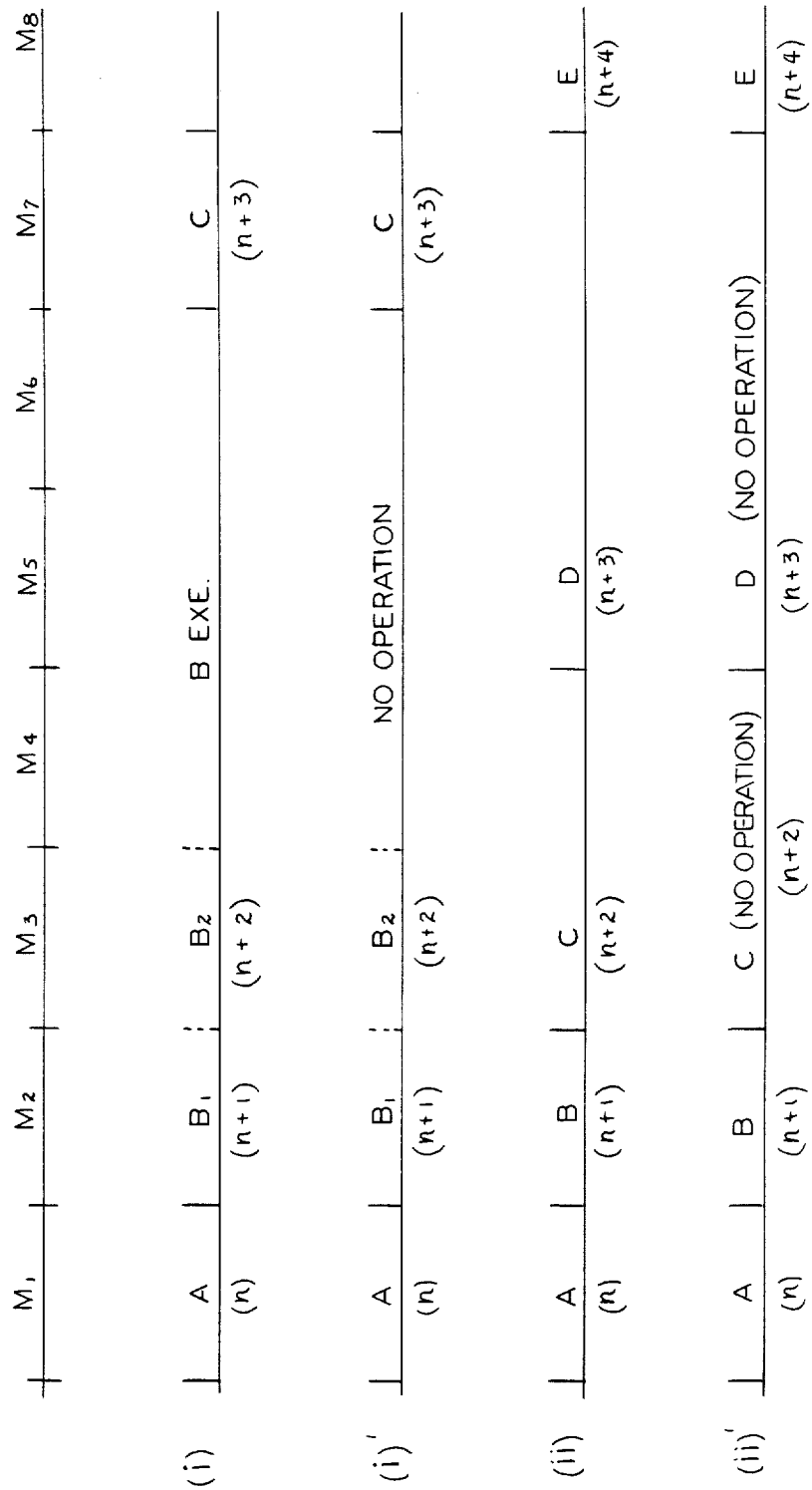
FIG. 2 is an operation timing chart for the prior art apparatus illustrated in FIG. 1.

In FIG. 1, an information handling apparatus in the prior art is illustrated as a block diagram. A group of instructions which are used to program processing are preliminarily stored in a memory 1, in which a necessary instruction is designated by a content (an address) of an address register 6. To the memory 1 are coupled an address bus 10 and a data bus 9. These buses are respectively formed of a plurality of signal lines which handle a plurality of bits simultaneously for executing a high-speed processing. An instruction designated by the content of the address register 6 is read out to the memory 1 responsive to a read-out control signal which is sent on wire 18 from control circuit 4.

Then, an instructionn code in the first byte of the read out content is fetched in an instruction register 2 in response to an instruction fetch signal sent over wire 16 from a control circuit 4. This instruction code is decoded by a decoder 3, and the results are sent to the control circuit 4 via a bus 12. The control circuit 4 produces various kinds of control signals which it applies to data bus 13 and transmits to an execution circuit 5 for processing a program, on the basis of the decoded results.

The execution circuit 5 comprises element means used for executing a program, such as registers, an arithmetic-logic unit, gate circuits, etc. They execute a read-out instruction as controlled in timing by the control signals sent over data bus 13. The control circuit 4 applies an address advance signal over wire 14 to an incrementer 7 in order to read out an instruction to be subsequently executed. The incrementer 7 has an addition facility for incrementing the present content in the address register 6 by +1 in response to the address advance signal received over wire 14. Then, the result of the addition (the next address) is set in the address register 6.

It is to be noted that the address register 6 is programmable. Namely, any desired address can be set therein via a bus 11, and the content of register 6 can be reset. In the case where one instruction is formed of a plurality of bytes, it is necessary to designate as many addresses as there are bytes. For instance, in the event that one instruction is formed of 3 bytes (3-byte instruction), three addresses generally represented n, n+1 and n+2 can be produced. These addresses are prepared by the incrementer 7. Since at least one machine cycle is required for each memory access, for the purpose of reading out a 3-byte instruction, at least 3 machine cycles are required. In practice, since a time period is also required for executing a processing on the basis of the instruction, 4 to 6 machine cycles are required.

When a certain instruction is read out of the memory 1 and set in the instruction register 2, this instruction is decoded by the decoder 3. Now, if a condition for canceling the instruction is fulfilled in the apparatus, a control signal is generated on wire 15 to activate an inhibit circuit 8. As a result, an inhibit signal appears on wire 17 for inhibiting the execution of that instruction in the control circuit 4. This inhibition signal on wire 17 serves to inhibit the output of the control signals 13 which are normally generated on the basis of the decoded result. Accordingly, the execution circuit 5, does not receive the control signals 13, and can not execute the inherent processing defined by the instruction in question. Circuit 5 is held in the previous condition. In the prior art, this time period for holding the previous condition was equal to the time period required for executing the inherent processing defined by the instruction.

The mode of the above-described operations will be now explained with reference to the timing chart in FIG. 2.

In FIG. 2, reference symbols $M_1$ to $M_8$, respectively, denote successive machine cycles. While the machine cycles are normally allotted independently for the respective instructions, here for convenience of explanation, consecutive suffixes are added to the symbols M representing successive machine cycles. That is, a description will be made here of instructions to be executed in the 8 machine cycles $M_1$ to $M_8$. Depending upon an apparatus, the durations of the machine cycles are different, but here it is assumed that all the machine cycles have the same duration. However it is to be noted that the present invention is also applicable to an apparatus having machine cycles of different durations. In FIG. 2, A, B, C, D and E denote respective instructions, and parenthesized symbols n, n+1, n+2, n+3 and n+4 noted thereunder means the addresses for designating the corresponding instruction. Furthermore, consecutive symbols $B_1$ and $B_2$ indicate that the instruction B is a 2-byte instruction, and they denote the instruction codes of the first byte and the second byte, respectively.

FIG. 2(i) shows the mode of operation for a 1-byte instruction A, a 2-byte instruction B and a 1-byte instruction C. Processings inherently defined by the respective instructions are executed. FIG. 2(i)' shows the mode of operation in which, among the above-mentioned instructions, for the 2-byte instruction B, the processing is not to be executed. FIG. 2(ii) shows the mode of operation in which the respective instructions are to be normally executed, in the case where all the instructions A to E are 1-byte instructions. Among these instructions, the instruction C and the instruction D, respectively, require 2 machine cycles and 3 machine cycles. FIG. 2(ii)' shows the mode of operation where, among the above-mentioned instructions, the consecutive instructions C and D are not to be executed.

In the following, the above-referred respective modes of operations will be described in more detail with reference to FIG. 1.

In the mode of operation shown in FIG. 2(i), at first, an address (n) is set in the address register 6, and the instruction A is read out of the memory 1. The read instruction A is a 1-byte instruction, which is decoded by the decoder 3, and the decoded result is transmitted to the control circuit 4. On the basis of this decoded result, the control circuit 4 generates control signals which are sent over data bus 13 for execution of the instruction A. In response to the control signals on data bus 13 processing is executed in the execution circuit 5. It is assumed that this processing can be executed in one machine cycle $M_1$.

When the execution of the instruction A has been finished (practically in the last state in the first machine cycle $M_1$), the control circuit 4 generates an address advance signal sent over wire 14 for incrementing the content of the address register 6 by $+1$. As a result, the present content (n) of the address resister 6 is modified to become (n+1) by the incremeter 7. The next machine cycle $M_2$ is a cycle allotted to the instruction B, which is a 2-byte instruction. In the machine cycle $M_2$ is read the instruction code $B_1$ of the first byte of the 2 bytes according to the modified address (n+1). In this instruction code $B_1$ is set an information indicating that the instruction B is a 2-byte instruction. Accordingly, that information is decoded by the decoder 3, and hence a procedure for reading the next subsequent instruction code $B_2$ is effected. This procedure includes the processing for modifying the content of the address register 6 from (n+1) to (n+2) by controlling the incremnter 7.

In the next machine cycle $M_3$ is read the instruction code $B_2$ of the second byte. It is assumed that this instruction B requires a total of 5 machine cycles before the processing designated by the instruction has been completely executed. Accordingly, the processing for the instruction B can be terminated at the end of the machine cycle $M_6$. It is to be noted that during the machine cycles $M_4$ to $M_6$, the content (n+2) of the address register 6 is not modified. This is because, during these machine cycles, the address advance signal on wire 14, for controlling the incrementer 7, is not generated by the control circuit 4.

The next address advance signal on wire 14 is generated in a last state of the machine cycle $M_6$, thereby the content of the address register 6 is modified from (n+2) to (n+3). In the next machine cycle $M_7$, the 1-byte instruction C is read out of the memory 1 and executed. In this way, the instructions A, B and C are successively executed in the seven machine cycles $M_1$ to $M_7$.

If, where among these instructions A, B and C, the instruction B is not necessary to be executed, the mode of operation will take the form illustrated in FIG. 2(i)'. More particularly, the two instruction codes $B_1$ and $B_2$ forming the 2-byte instruction B are read in the instruction register 3 during the machine cycles $M_2$ and $M_3$, respectively, and they are decoded by the decoder 3. However, a signal on wire 15 indicates non-execution. The inhibition circuit 8 is actuated to transmit an inhibit signal over wire 17 to the control circuit 4, so that the control signals are not sent over data bus 13, in response to the instruction B, from the control circuit 4 to the execution circuit 5, Accordingly, during the period of the machine cycles $M_2$ to $M_6$ which are normally required for executing the instruction B, the execution circuit 5 makes no operation. In other words, according to this prior art, a wasteful time is spent in the machine cycles $M_2$ to $M_6$.

In the mode of operation illustrated in FIG. 2(ii), the instructions A, B, C, D and E, which are all one byte instructions, are executed. Among these instructions, the instructions C and D respectively necessitate 2 machine cycles and 3 machine cycles as a read-out and an execution periods. Accordingly, if these instructions C and D are respectively inhibited from execution by the inhibition circuit 8 (FIG. 2(ii)'), the execution circuit 5 also wastefully spends a time without executing anything during the machine cycles $M_3$ to $M_6$.

As described above, in the heretofore known information handling apparatus, if an instruction is not to be executed in a routine which must be passed in view of convenience for a program processing, the time period which is inherently necessary for executing the instruction was elapsed under a non-operation condition. Moreover, this time period is not a period reserved for controlling an operation timing in the apparatus, but is reserved merely for the purpose of waiting for the next new instruction, without executing the intended instruction. Accordingly, it is desirable to make the period under the non-operation condition as short as possible.

However, in the prior art apparatus, a facility was not provided for shifting from one instruction to a next new instruction at a high speed. It was impossible to shorten the period of the non-operation condition. One of the reasons is that addressing means for designating the next instruction is uniquely fixed to operate in response to machine cycles necessary to execute the present instruction. Moreover, another reason is that the apparatus is designed in such a manner that, when the instruction not to be executed is formed of a plurality of bytes, all the bytes have to be read out of memory before there can be a shift to the next new instruction. Accordingly, the processing speed of the heretofore known apparatuses was, in any event, determined solely by the frequency of the operation clock applied to the apparatus and the procedure for processing a program. It was impossible to further increase the processing speed.

DESCRIPTION OF THE INVENTION

An information handling apparatus according to one preferred embodiment of the present invention is illustrated in a block diagram of FIG. 3. A group of instructions, which are used for executing a program, are stored in a memory 21. Each memory location corresponds to instructions therein is designated by a content (address) of an address register 26. Then, a designated instruction is read out of memory 21 in response to a read-out control signal on wire 39. The read-out instruction is fetched into an instruction register 22. The address is transferred in a parallel form of a plurality of bits (for instance, 8 bits) through an address bus, and the instruction is read out in a parallel form of a plurality of bits (for instance, 4 bits) through data bus 29.

A fetch operation to the instruction register 22 is carried out in response to a fetch control signal on wire 36 which is issued from a control circuit 24. The instruction set in the instruction register 22 is decoded by a decoder 23, and signals are sent over data bus 32 representing the results of decoding which are transferred to the control circuit 24. The control circuit 24 applies control signals over data bus 33, which are required for executing the instruction, to a program execution circuit 25, on the basis of the decoded results. The execution circuit 25 executes the read-out instruction in response to the control signals on data bus 33. The above-mentioned process is similar to that in the conventional information handling apparatus, in the prior art, as described previously with reference to FIGS. 1 and 2. Further, this embodiment has a novel address control circuit 27.

Now let us consider the case of an instruction where execution is canceled. In other words, it is assumed that for an instruction, which should be accessed, a condition occurs so that it is unnecessary to execute this instruction. In this case, a signal is issued from the decoder 23 over wire 35 indicating that execution of the instruction should be inhibited. Or, a signal may be issued from another circuit over wire 38 indicating that execution of the instruction should be inhibited. The other circuit may be an external peripheral unit or the like. As a result, an inhibition signal is issued over wire 37, from an inhibit circuit 28, in response to the signal on wires 35 or 38. The inhibition signal on wire 37 controls the control circuit 24 so that the control signals on data bus 33, on the basis of the decoded instruction, may not be transferred from the control circuit 24 to the execution circuit 25. As a result, the instruction is nullified, and the execution circuit 25 does not execute the operation defined by the instruction. During this time period, the execution circuit 25 either holds the previous condition or is reset.

In addition, at this moment, when it has been detected that the instruction is not to be executed, the decoder 23 applies information for advancing an address of the address register 26 to an address control circuit 27. As this information on data bus 34, could be used data representing how many bytes are included in the instruction to be nullified. This data is normally set in a first byte of the instruction which should be not executed. Therefore, the first byte of the instruction has to be read out of the memory 21 and to be decoded. For instance, if it is a 3-byte instruction, then information representing the present content of the address register 26 (at this moment the content being the address designating the first byte of the instruction) should be advanced by 3, and it is so advanced responsive to signals applied over bus 34 to the address control circuit 27. As a result, "3" is added to the present content of the address register 26 by an adder means included in the address control circuit 27. Thus, the content of the register 26 is modified to become the address corresponding to a next new instruction. This modification of an address needs only a very short period. Hence, it can be executed within one machine cycle in which the first byte of the instruction not to be executed is read out and decoded. Consequently, an address is not read out as a designation for the remainder bytes of the instruction, which should not be executed. Therefore, in the next subsequent machine cycle, a new address for designating an instruction to be newly read out has been already set in the address register 26. The process can immediately proceed to the execution of the next new instruction without redundantly spending a wasteful time as is the case with the prior art apparatus.

Also, even if the instruction to be nullified is a one-byte instruction, the present invention is effective if the instruction requires a plurality of machine cycles for execution. More particularly, the apparatus according to the present invention comprises means for modifying an address without respect to an execution of an instruction. Therefore, a processing for a next new instruction can be immediately carried out after an address modification is terminated. The time period of this modification is at most one machine cycle. In this case, a reset signal 38 is applied to the inhibit circuit 28 after the modification is terminated. Thus, the inhibit condition of the execution circuit 25 is released. A machine cycle succeeding the machine cycle of the address modification can be effectively used as a read period for either the next new instruction or an execution period for the read-out new instruction, without being wasted as a non-execution period.

Now, a description will be made of a more detailed contruction of the address control circuit 27, with reference to FIGS. 4 and 5.

FIG. 4 shows one example of the address control circuit employing an adder circuit 40, in which address advancing information appears on data bus 34 and is applied to one input of add circuit 40. A present content is applied to data bus 42 by the address register and is applied to the other input of add circuit 40. The result of the addition is set in a register 41 and then transferred to the address register 26 as a new address. As a matter of course, the register 41 could be omitted and replaced by the address register 26.

FIG. 5 shows another example of the address control circuit in which an incrementer 51 is used. From a register 52, which hold the present content of the address register 26, the content is input to the incrementer 51, and it is incremented by +1 each time when a signal is issued from a count control circuit 50 over conductor 53. The count control circuit 50 detects the necessary number of counts on the basis of the address advance information 34 and thereby controls the incrementer 51. In this case, a signal on conductor 53 is a signal for an instruction address addition. Moreover, since the addition can be executed at a high speed, it is possible to achieve the addition operations a plurality of times within one machine cycle. In this connection, it is preferable to synchronize the output timing of the signal on wire 53 with a basic operation clock signal of the apparatus.

As described above, according to the present invention, with regard to an instruction consisting of a plurality of bytes or an instruction necessitating a plurality of machine cycles, a processing for nullifying the instruction can be executed within an extremely short period of time. Therefore, the program processing speed can be greatly emhanced. It is to be noted that obviously this effect of the present invention can be expected for every type of apparatuses irrespectively of whether the apparatus is of a low-speed type or of a high-speed type.

In the following, a description will be made of other preferred embodiments of the present invention with reference to representative examples of practical instructions and procedures for their execution.

Among the instructions used in a micro-computer (for example, 4-bit system), there is a skip instruction. First of the above preferred embodiments related to this skip instruction which is an instruction where a predetermined condition is fulfilled within a computer and/or external units added thereto. Then, a processing is carried out so that an instruction stored at the memory location subsequent to the skip instruction is skipped (that is, the subsequent instruction is disregarded). The execution of the further subsequent instruction (the second instructions subsequent to the skip instruction) is commenced.

For instance, it is assumed that the memory stores a skip instruction reading "skip, if single register is O" and consequently therewith stores a branch or jump instruction reading "branch or jump to address X" subsequent to the skip instruction. In this case, if the single register is 1, then the branch or jump is not effected because the branch or jump instruction is skipped, but if the single register is not O, then the next instruction is not skipped. Therefore, the next branch or jump instruction is executed, and the processing branches or jumps to address X. Accordingly, by arranging the above-mentioned two instructions consecutively in the above-described manner, one can construct a conditional branch or jump instruction so that if the single register is not O, then branch or jump to address X, but if it is O, then not branch or jump (execute the next instruction).

Moreover, by combining various other instructions with a skip instruction as subsequent instructions, the skip instruction can be used more widely. Subsequent processing instructions are executed only when the condition designated by the skip instruction is not fulfilled. The subsequent instructions are to be disregarded when the condition designated by the skip instruction is fulfilled. The same effect as this skip instruction can be achieved by employing the conventional conditional jump instruction and selecting the destination of jump at the second instruction, subsequent to the conditional jump instruction. However, in the case of the jump instruction, it is always necessary to designate the address of the jump location.

The skip instruction has a merit in that regardless of how many bytes the next instruction to be disregarded may comprise, the second instruction subsequent to the skip instruction can be used without designating the address of that instruction at all. Accordingly, the skip instruction is made more excellent in view of the effective utilization of a memory. The skip instructions for effecting such processing have been widely and conveniently utilized especially in a micro-computer of 4-bit system or 8-bit system or the like which has a fewer kinds of instructions. Furthermore, besides the above-described skip instruction, a processing of disregarding a certain instruction can be effectively utilized also in the following case.

Furthermore, the present invention is also effectively utilized in an information handling apparatus having a memory in which a plurality of instructions of the same type are stored, at locations which are sequentially designated by consecutive addresses. The information handling apparatus according to the second preferred embodiment has a function such that after a certain instruction stored at an initially designated address has been executed, the next further instruction is processed. However, if an instruction stored at the next designated address is the same type of instruction as the initial instruction, then the processing should proceed to the next further instruction while disregarding the next instruction (not executing this same type of instruction (the second instruction).

If the above-mentioned function is provided, it can be utilized conveniently, as will be described below. For instance, it is assumed now that the beginning of a certain subrouting includes an instruction that a value "3" should be set in an single register. At second location is arranged an instruction that a value "4" should be set in the single register, and at the third location is arranged an instruction that a value "5" should be set in the A-register. Subsequent thereto, there is an instruction for a sub-routine for carrying out a processing by making use of the content of the single register. When the processing enters this subroutine, if it enters at the first instruction, that value "3" should be set in the single register. Then according to this subroutine at first 3 is set in the single register. However, since the next instruction, (i.e., the instruction that the value "4" should be set in the single register) is an instruction of the same type as the aforementioned initially executed instruction that the value "3" should be set in the single register (such instructions being defined to be of the same type), the above-mentioned next instruction to set "4" is disregarded, as a result of the above-referred function.

The procesing proceeds further to the next subsequent instruction that the value "5" should be set in the single register. However, this next subsequent instruction is disregarded because it is also of the same type as the preceding instruction. In this case, the subroutine would be executed by employing the value "3" initially set in the single register as a parameter.

On the other hand, upon initially entering this subroutine, if the processing enters at the second instruction, the value "4" should be set in the single register. Then due to a processing similar to the above-described processing, in this case the subroutine would be executed by employing the value "4" as a parameter. Likewise, if the processing enters at the third instruction that the value "5" should be set in the single register, then the subroutine would be executed by employing the value 5 as a parameter. In this way, one can simply prepare a subroutine in which a processing is executed with different parameters by merely variably designating the initial entrance address.

Throughout this specification, the aforementioned function defines a group of given instruction to be of the same type. In the case where instructions of the same type appear consecutively, while the initial instruction would be executed, the subsequently appearing instruction or instructions of the same type would be disregarded. This technique is called the "stack-up function of instructions".

Let us now consider the case where, upon carrying out the aforementioned skip instruction or stack-up function of instructions, the correspondingly required condition has been fulfilled. That is, for a skip instruction, the condition designated by this instruction has been fulfilled. For a stack-up function of instructions, the condition that a certain instruction is of the same type as the previous instruction has been fulfilled).

In the heretofore known microprogram control apparatus, a method was employed such that during the period when the instruction is disregarded, an inhibition circuit is activated for inhibiting the execution. Therefore, for an instruction which required, for example, 6 machine cycles for execution, in the heretofore known apparatus even in the case of nullifying this instruction, it was completed that only after 6 machine cycles were spent, which is similar to a regular execution of this instruction. The known processing can shift to the next instruction only after 6-cycles, and so, the known apparatus had a shortcoming because the processing time was unnecessarily prolonged.

A microprogram control apparatus according to one preferred embodiment of the present invention will be described next. A microprogram counter designates a memory address of a micro-instruction. A decoder determines whether or not a decoded micro-instruction belongs to a group of micro-instructions defined as the same type as the micro-instruction processed immediately before the decoded micro-instruction. The execution of the decoded micro-instruction is suppressed in the event that the micro-instruction decoded by the decoder has been determined to be of the same type as the micro-instruction processed immediately before the decoded micro-instruction. The content of the microprogram counter is set to designate the address of the micro-instruction next to the decoded microprogram in the aforementioned event.

Now the above-outlined microprogram control apparatus according to the present invention will be described in more detail with reference to FIG. 6. At first, a description will be made in connection with a skip instruction.

Figure 6:
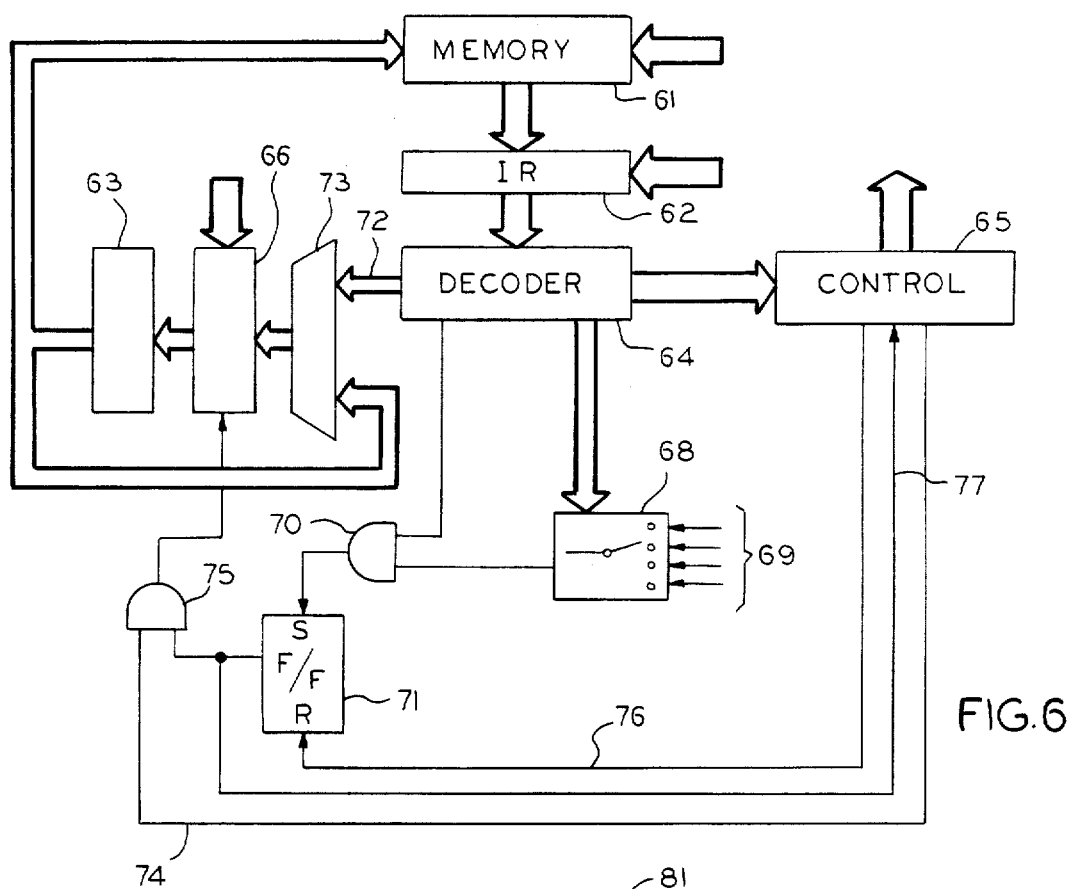
FIG. 6 is a block diagram illustrating an essential part of another preferred embodiment of the information handling apparatus according to the present invention.

FIG. 6 is a block diagram adapted for explaining the operation in response to a skip instruction. Reference numeral 61 designates a micro-instruction memory circuit. In the case of executing a given instruction, during a first machine cycle for that instruction, at first, a first byte of this instruction stored at an address designated by an address counter 63 is read out of the memory 61. Then, it is stored in an instruction registor 62. When the first byte of the micro-instruction has been read in the instruction register 62 in the above-described manner, it is decoded by a decoder 64. Depending upon whether this instruction is a 1-byte instruction, 2-byte instruction, 3-byte instruction, or otherwise, a control circuit 65 controls a program counter control circuit 66. As a result, for each one of the machine cycles required for further decoding this instruction, the content of the program counter 63 is stepped one by one. As a result, all the bytes belonging to that instruction are successively fetched in the instruction register 62 where they are held to be decoded.

In this way, the processing designated by this decoded micro-instruction is executed by an execution circuit (not shown) that is controlled by the control circuit 65. Then, after a number of machine cycles, which are required for executing this instruction have elapsed, the control circuit 65 further advances the content of the program counter 63 by 1 via the program counter control circuit 66. In the next machine cycle, the first byte of the next instruction stored at the address designated by the content of this program counter 63 is read out, and thus the processing proceeds to execution of the next new instruction.

Here it is assumed that a skip instruction has been fetched in the instruction register 62. As described above, this skip instruction is decoded by the instruction decoder 64. Due to the designation that this instruction is a skip instruction, a logic level on a skip instruction designating line 67 is turned to "1". Furthermore, the portion designating a skip condition in this skip instruction is fed to a skip condition selection circuit 68, in which amoung various skip conditional signals are indicated via wires 69. A conditional signal designated by this skip condition is selected. In these conditional signals on wires 69 are included various conditional signals such as, for example, a signal adapted to take a logic level of "1" if the content of the aforementioned A-register is 0. However, the signals at input wires 69 take a logic level of "0"if the content of the A-register is not 0, or a logic level of "1"if input data are present at a designated input port. Signals on wires 69 take a logic of "0"if input data are not present, or if a signal indicates a detected condition of a carry output and/or a flag of an ALU. An AND circuit 70 selects the conditional signal selected in the skip condition selection circuit 68 and combines it with the signal on the above-mentioned skip instruction designating line 67. The combined signal is applied to a set terminal of a flip-flop 71.

Accordingly, the flip-flop 71 can be set provided that a skip instruction has been decoded and also provided that the condition designated by the skip instruction is fulfilled. When the above-described processing of the skip instruction has been terminated, the control circuit 65 controls the program counter control circuit 66 to advance the content of the program counter 63 by "1". In the next machine cycle, the first byte of the instruction starting from the address next to this skip instruction is fetched in the instruction register 62. In this way, information about how many bytes are in a given instruction, can be obtained by decoding the first byte of the instruction. This information indicating a number of bytes in an instruction is extracted and applied to one input of an adder 73 via a byte number output line 72. To the other input of this adder 73 is applied the content of the program counter 63.

At the time point when the first byte of the instruction was read, the decoding of the number of bytes in that instruction was completed. Also, adder 73 provided the addition of the input of the byte number and the content of the program counter 63, which has been completed in the above-described manner. The control circuit 65 outputs a program counter write pulse through a program counter write pulse line 74. This program counter write pulse line 74 and the output line of the above-mentioned flip-flop 71 are combined, in logic, by a second AND circuit 75. Hence, the flip-flop 71 is set only when the preceding instruction was a skip instruction and the designated skip condition is fulfilled. Then, on the output side of the second AND circuit 75 appears the write pulse issued from the control circuit 65 via the program counter write pulse output line 74. This write pulse controls the program counter control circuit 66 to write the output of the adder 73 in the program counter 63. Then, the content of this program counter 63 designates the first byte of the second instruction, subsequent to the skip instruction.

The above-described processing is completed generally in the machine cycle in which the first byte of the instruction, immediately following the aforementioned skip instruction. Now, the first byte of the designated second instruction is fetched in the instruction register 62 during the next machine cycle, and at this moment the processing first enters the first machine cycle of this instruction.

It is to be noted that control circuit 65 generates a reset pulse at a time point near to the end of this machine cycle, after it generated the write pulse on the program counter write pulse line 74. This reset pulse is applied to a reset terminal of the flip-flop 71 via a reset pulse line 76, and so, the flip-flop 71 is reset. Moreover, the output of the flip-flop 71 is both serves as one input of the second AND circuit 75 is applied via an instruction execution suppress signal line 77 to the control circuit 65, as an instruction execution suppress signal. Except for the generation of the program counter write pulse and the generation of the reset pulse, the other processing to be executed as a result of decoding of the first byte is suppressed during the period when the logic level of signal line 77 is "1". At the same time, the trailing edge portion of this suppress signal is utilized to set the control circuit 65 so that, in the next machine cycle, the byte fetched in the instruction register 62 may be processed as the first byte of the next new instruction.

As a matter of course, even if a skip instruction is decoded and if the condition designated by the skip instruction is not fulfilled, the instruction next to the skip instruction is executed according to the regular process since the flip-flop 71 is not set. This is described in the initial part of the description of the apparatus shown in FIG. 6.

In this way, the previously described function in response to the skip instruction can be realized. As will be apparent from the above description, if a skip condition designated by a skip instruction is fulfilled and regardless of the instruction subsequent to the skip instruction it is always possible to nullify that instruction and to proceed to the second new instruction within at most one machine cycle. This nullification and proceed within one cycle occurs (regardless of how many machine cycles are required for regularly executing this instruction).

Figure 7:
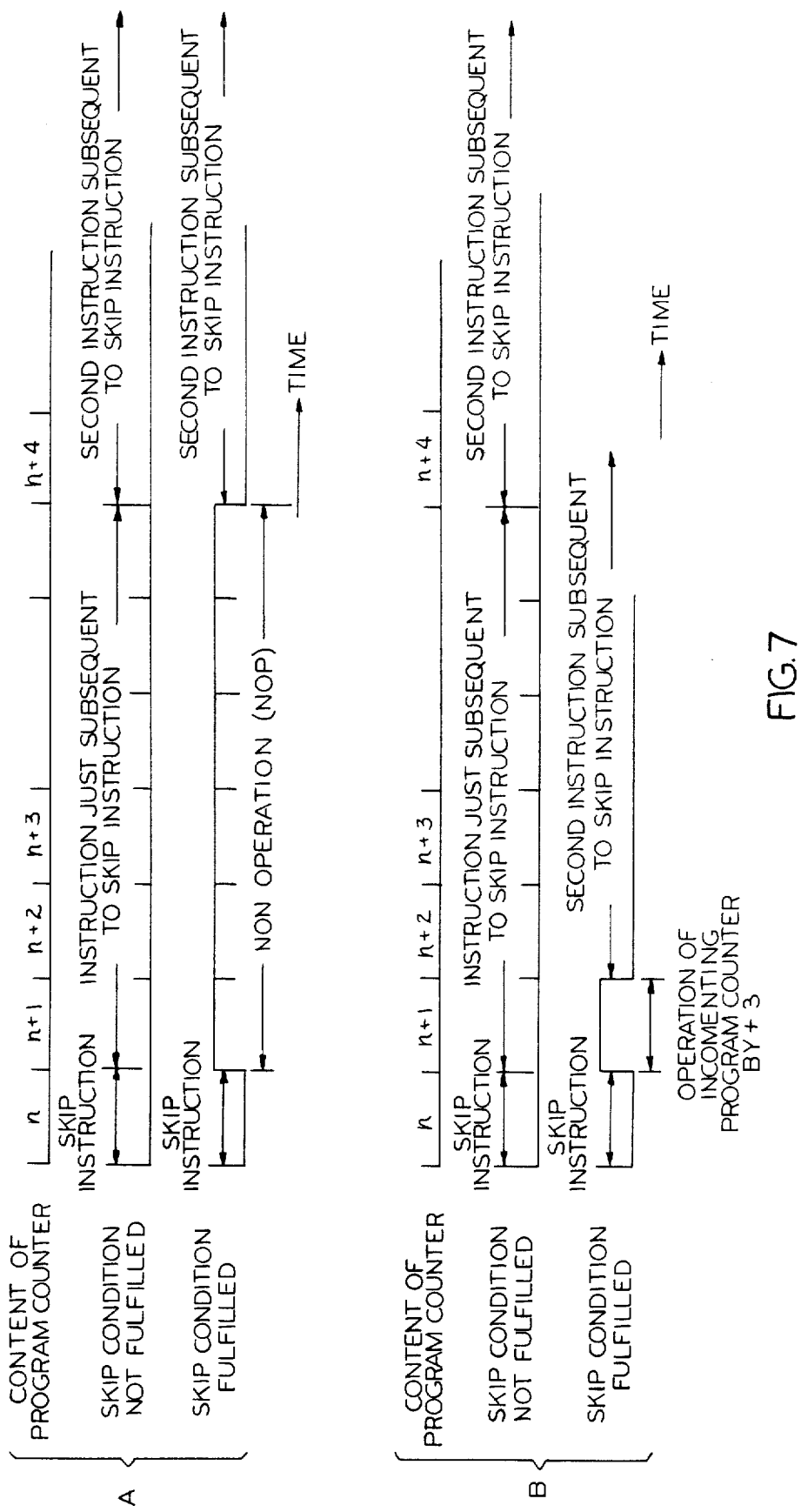
FIGS. 7A and 7B, respectively, show an operation timing chart of the prior art apparatus and an operation timing chart of the apparatus shown in FIG. 6.

The timing chart of the above-described processing is illustrated in FIG. 7. FIG. 7A represents the timing relation in the case of the prior art apparatus. Assuming that the memory address where an skip instruction is stored in n, initially when the content of the program counter is n, the skip instruction is read out. Here it is assumed that the skip condition is not fulfilled. Then, in the next machine cycle, the content of the program counter is increased to n+1, and the first byte of the next instruction is read out. It is assumed that this instruction is a 3-byte instruction (for instance, a call instruction) which requires 6 machine cycles for its execution. In this assumed case, the content of the program counter steps up to n+3 in the subsequent two machine cycles to read out all the instruction of 3 bytes. The execution of this instruction is completed by spending a further 3 machine cycles. In the next subsequent machine cycle, the program counter steps to n+4 to read out the first byte of the second instruction after the skip instruction. The processing newly enters the execution of this instruction. The processing in the above-described case is represented by the second diagram as noted "Skip Condition not Fulfilled" in FIG. 7A.

Suppose that the skip condition is fulfilled during all the machine cycles in which the instruction just subsequent to the skip instruction (in the above-assumed case, a call instruction) is to be executed. In place of the inherent execution of the call instruction, a non-operation condition is maintained. After the 6 machine cycles have been spent without executing any processing effectively, the processing enters an execution of the second instruction subsequent to the skip instruction. This processing is represented by the third diagram as noted "Skip Condition Fulfilled" in FIG. 7A.

On the other hand, the timing chart in the case of the apparatus according to the present invention shown in FIG. 6, is illustrated in FIG. 7B. In this case also, when the skip condition is not fulfilled, the mode of processing is quite similar to that in the prior art apparatus shown in FIG. 7A. However, in the event that the skip condition is fulfilled, as shown by the third diagram designated as "Skip Condition Fulfilled" in FIG. 7B, in the next one machine cycle subsequent to the skip instruction, the program counter is advanced by the number of bytes of the instruction which appears just after the skip instruction. The advance is the number of bytes of the instruction which are to be skipped, at a time. In the illustrated example, the program counter is advanced by "3" at a time. Hence, in the next following machine cycle, the processing can enter execution of the second instruction following to the skip instruction.

It is to be noted that the address of the second instruction was directly obtained when the adder adds the content of the program counter and the number of bytes of the instruction just subsequent to the skip instruction. Therefore, the skip processing was achieved within a minimum processing time in the preferred embodiment of the present invention illustrated in FIG. 6. Instead the skip processing can be effected in the following manner.

That is, both the output of the flip-flop 71 and the output on the byte number output line 72 are directly applied to the program counter control circuit 66. In this alternative embodiment, in the event that the output of the flip-flop 71 has become a logic "1", the content of the program counter 63 could be stepped at a higher cycle repetition frequency than that employed in the regular instruction processing. The higher frequence is raised by a factor of the number of bytes designated by the output on the byte number output line 72. By making the above-mentioned provision, the processing time, in the case where the skip condition is fulfilled, can be made shorter than that of the prior art apparatus.

While the present invention has been described above in connection with a nullification of the instructions to be skipped in the case of employing a skip instruction, the invention is equally applicable to the case where the above referred "stack-up function of instructions" is utilized.

Figure 8:
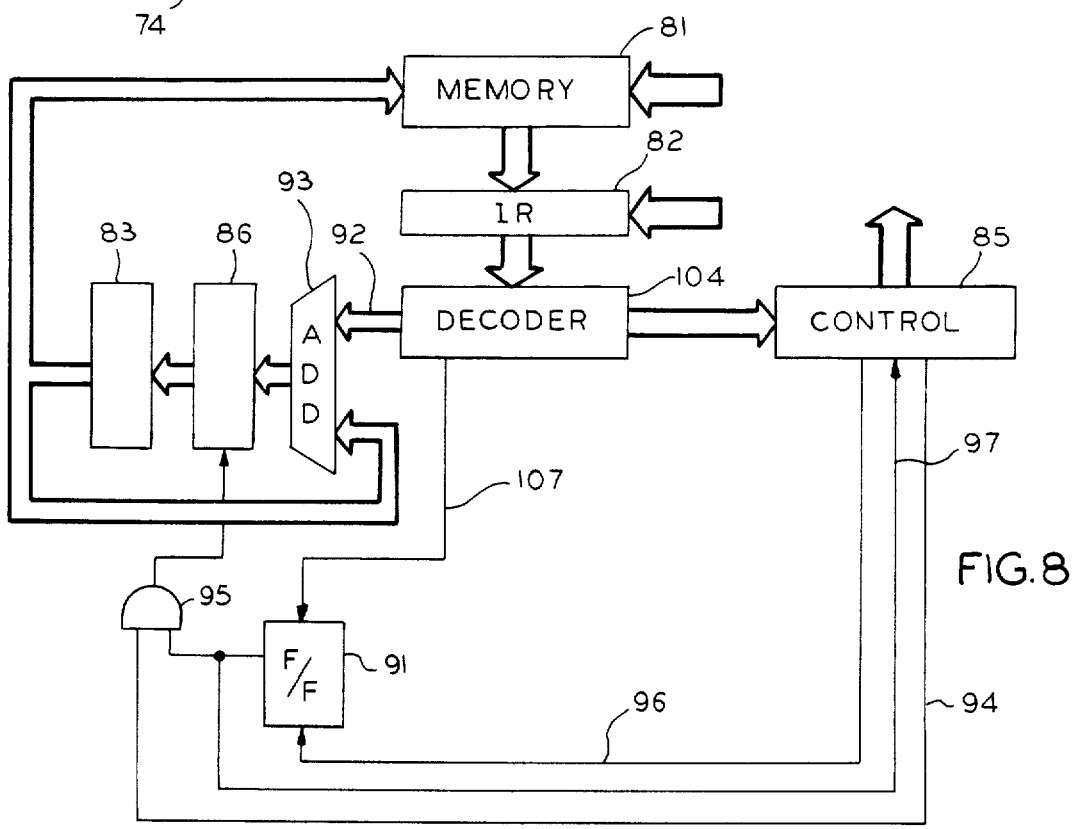
FIG. 8 is a block diagram illustrating an essential part of still another preferred embodiment of the present invention.

A still another preferred embodiment of the present invention is illustrated in a block diagram in FIG. 8. While reference numeral 104 designates a decoder having a function similar to the instruction decoder 64 in FIG. 6, decoder 104 further has the following added function. That is, when a first byte of a given instruction has been fetched in an instruction register 82, the decoder 104 compares the information contained in this newly read-out byte with the information contained in the first byte of the just preceding instruction which is stored in the decoder 14, to check whether or not the newly read-out instruction is of the same type, in definition, as the just preceding instruction. For this checking, it is only necessary to compare the respective instructions with respect to the principal portions of their codes or with respect to their code portions indicating the type of instructions.

In this way, if the present invention is detected to be an instruction of the same type as the just preceding instruction, then the decoder 104 outputs a pulse of a logic level "1" onto a stack-up instruction detection line 107. This detection line 107 is compled to a set terminal of a flip-flop 91, which has a function similar to the function of to the flip-flop 71 in FIG. 6, to set the flip-flop 91. Once this flip-flop 91 is set, then the subsequent processing is almost similar to that described above with reference to FIG. 6. In a program counter 83 is written an output of an adder 93 which adds the present content of the program counter 83 with an output on a byte number output line 92 which output represents the number of bytes of the decoded instruction. In addition, the set output of the flip-flop 91 controls a control circuit 85 via an instruction execution suppress signal line 97 so that execution of the decoded instruction may be suppressed. In this way, the above-mentioned processing is completed within the same machine cycle in which the first byte of this instruction was read out.

This is similar to the processing described above with reference to FIG. 6. In the next subsequent machine cycle, the first byte of the next new instruction is read in the instruction register 82, so that the processing can immediately enter the machine cycle for executing the instruction.

Also, as noted previously in connection with FIG. 6, instead of employing the adder 93 in FIG. 8 the output of the flip-flop 91 and the output of the byte number output line 92 could be directly applied to a program counter control circuit 86. In this modified case, when the output of the flip-flop 91 takes a logic level "1", the content of the program counter 83 could be stepped at a higher cycle repetition frequency than that employed in the regular instruction processing. The higher frequency is increased by a factor of the number of bytes designated by the output on the byte number output line 92.

As described above, according to the present invention there is an advantage that, in the case of nullifying a subsequent instruction or instructions of the same type by employing the stack-up function of instructions, a microprogram control apparatus is provided which can process within a shorter processing time than the prior art apparatus. Furthermore, it will be obvious that in the above-described respective embodiments, if necessary, the control can be made such that an instruction appearing in a plurality of steps may be nullified after a given instruction.

What is claimed is:

1. Improvement in means for reading memory contents and executing instruction in an information handling apparatus, comprising:
    memory means for storing a plurality of instructions, including a skip instruction, an instruction following said skip instruction being comprised of a plurality of bytes;
    addressing means coupled to said memory means for reading a first single byte of an instruction out of said memory means responsive to sequential byte addresses;
    decoding means coupled to said memory means for decoding the instructions which have been read out of said memory means responsive to said addressing means in order to output a plurality of decoded signals;
    means coupled to said decoding means for producing at least one control signal in response to said decoded signals, said addressing means receiving the control signal and advancing to a new address where a next single byte is read out following the previously last read out single byte which was read from said memory in response to said control signal;
    generating means coupled to said decoding means and being responsive to said next signal byte for generating a skip signal designating a skip operation when said next single byte is decoded by said decoding means and found to be said skip instruction; and
    means coupled to said generating means and operated responsive to said skip signal for producing a next address designating a next instruction which is immediately subsequent to said instruction following said skip instruction, said next address being produced by adding the byte address next following said new address, which designates said skip instruction, to the number of bytes of said instruction following said skip instruction.

2. The information handling apparatus as claimed in claim 1, further comprising means coupled to said generating means for inhibiting said skip signal when said instruction following said skip instruction is to be executed.

* * * * *